United States Patent Office 3,457,334
Patented July 22, 1969

3,457,334
MANUFACTURE OF NUCLEAR FUEL
Geoffrey Winton Horsley, Dorchester, England, assignor to United Kingdom Atomic Energy Authority, London, England
No Drawing. Filed Feb. 27, 1967, Ser. No. 619,046
Claims priority, application Great Britain, Mar. 11, 1966, 10,923/66
Int. Cl. G21c 21/02
U.S. Cl. 264—.5                                3 Claims

ABSTRACT OF THE DISCLOSURE

A process in which particles of nuclear fuel oxides (or the like) are coated with pyrolytic carbon in an atmosphere into which carbon monoxide has been introduced from an extraneous source, so preventing losses by the evolution of volatile oxides.

BACKGROUND OF THE INVENTION

This invention relates to the manufacture of nuclear fuel in the form of nuclear fuel metal compounds. Irradiation tests of various nuclear fuel compounds suggest that the oxide lattice appears to be well adapted to accommodate and retain in its interstices, such as inter-crystalline spaces, atoms of fission products formed during irradiation. The relevance of this to fission product retaining fuel is immediately obvious since this type of fuel is designed to retain within it these products, and, to this end, attempts are made to form fuel particles with a porous internal structure but coated with a layer impervious to fission product diffusion. In another approach it has been suggested that dense particles of nuclear fuel compounds be coated with a porous layer in intimate contact with the fuel and that this layer be followed by a truly impervious layer.

The selection of oxides as being the more favourable compound for fission product retaining nuclear fuel presents some problems regarding their manufacture. As is known, it is preferable to dilute nuclear metal compounds in order to absorb fission fragments, for otherwise, when the atoms undergo nuclear fission, disruption of the particle may result. Now with carbide fuel compounds a comprehensive technology has been built up and a diluted uranium carbide has been developed having the carbon rich composition of 10 to 12 carbon atoms to each uranium atom but with the uranium existing mainly in the combined form. A fission product retaining layer in the form of a dense coating of pyrocarbon has been applied to these particles by the deposition of carbon from a hydrocarbon gas. It has been found however that the coating process commonly used to apply a fission product retaining layer to the carbide fuel particles, when applied particularly to porous oxide particles, apparently results in the partial transformation of the oxide to carbide and sometimes in a serious loss of fuel material due to the formation of volatile compounds with the carbon in the coating gas. Indeed it has been observed that when processing porous plutonium oxide particles, as much as 18% of the nuclear fuel metal can be lost from the fuel particles in this way if the conventional coating process is adhered to.

SUMMARY OF THE INVENTION

According to the present invention, in a process for coating particles with pyrolytic carbon derived from a carbon containing gas, which particles contain substances including oxygen in a combined form, carbon monoxide is introduced into the process atmosphere from an extraneous source so as to reduce the tendency for the reducing reaction between the oxygen in the particle and the coating gas to occur.

DESCRIPTION OF THE PREFERRED EMBODIMENT

Example

To prepare hard spheroids of a mixture of carbon and plutonium dioxide powder in proportions of between 10 and 20/1, 16 cc. of furfuryl alcohol were added to a mixture comprising 120 grams of powdered carbon and 140 grams of powdered plutonium dioxide. The mixture was subjected to a particle forming process by being granulated on a rotary sieve to a crumb size of between 350 and 300 microns. These crumbs were then rounded in a planetary mill revolving at 200 r.p.m. for ten minutes. The rounded particles, i.e., spheroids, were then sieved to obtain the size fraction required, 350–250 microns. A yield of about 50% rounded particles was obtained and the remainder were recycled.

The rounded particles were then hardened by passing a stream of either hydrochloric acid gas or formic acid vapour through a static bed of the particles to polymerise the furfuryl alcohol binder and so to harden the spheroids.

To coat the hard spheroids with pyrolytic carbon, a batch of spheroids produced as above were placed in the furnace chamber of a fluidised bed apparatus which was connected so that supplies of fluidising gas and a hydrocarbon gas could be injected into the chamber. Such apparatus is known for use in coating particles by pyrolytic deposition of carbon from a hydrocarbon gas by fluidising the particles in argon or other inert gas, and heating the furnace chamber to the cracking temperature of the hydrocarbon gas.

A supply of carbon monoxide was injected into the base of the furnace to fluidise the particles and the furnace resistance heated by an electric current. When a temperature of 1400° C.–1500° C. was reached, a supply of acetylene was injected into the furnace and the loss of plutonium by the evaporation through the formation of volatile plutonium oxycarbide, simultaneous with the introduction of acetylene, was inhibited by the carbon monoxide. A layer of pyrolytic carbon became deposited on the particle without deleterious interaction between this carbon and the oxide. The proportion of carbon monoxide to acetylene was 70:30 at the beginning of the coating operation but as the thickness of the applied coating increased so the carbon monoxide was reduced until when the final outer layers were reached this constituent represented only 7% of the carbon monoxide/acetylene mixture.

The resultant particles were found on X-ray analysis and metallographic examination to consist of a dispersion of $Pu_2O_3$ and $PuO_2$ in carbon surrounded by and contained by an impervious layer of pyrolytic carbon.

I claim:
1. A process of coating pyrolytic carbon on a nuclear fuel particle which comprises pyrolytically depositing carbon from a carbon containing gas on a particle, said particle comprising a nuclear fuel metal oxide, in the presence of carbon monoxide introduced to the zone of the pyrolytic deposition from a source extraneous thereto.

2. A process according to claim 1 wherein said carbon containing gas comprises a hydrocarbon.

3. A process according to claim 1 wherein said particle includes a polymeric binder and powdered carbon.

References Cited

UNITED STATES PATENTS

| 2,282,235 | 5/1942 | Moberly | 117—46 |
| 3,107,180 | 10/1963 | Diefendorf | 117—46 |
| 3,227,783 | 1/1966 | Williams | 264—.5 |
| 3,230,280 | 1/1966 | Kennedy | 264—.5 |
| 3,325,570 | 6/1967 | Blum et al. | 264—.5 |
| 3,331,897 | 7/1967 | Accary et al. | 264—.5 |

CARL D. QUARFORTH, Primary Examiner

R. L. GRUDZIECKI, Assistant Examiner

U.S. Cl. X.R.

117—46